US012502900B2

(12) United States Patent
Pan et al.

(10) Patent No.: US 12,502,900 B2
(45) Date of Patent: Dec. 23, 2025

(54) CANTILEVER ASSEMBLY, DIGITAL PRINTING MACHINE, AND CONTINUOUS PRINTING APPARATUS

(71) Applicant: BOMBYXJET CORPORATION, Taichung (TW)

(72) Inventors: John C. Pan, Taichung (TW); Sung-Yuan Lin, Taichung (TW); Ming-Hsiang Huang, Taichung (TW)

(73) Assignee: Bombyxjet Corporation, Taichung (TW)

( * ) Notice: Subject to any disclaimer, the term of this patent is extended or adjusted under 35 U.S.C. 154(b) by 156 days.

(21) Appl. No.: 18/624,278

(22) Filed: Apr. 2, 2024

(65) Prior Publication Data

US 2024/0408905 A1 Dec. 12, 2024

Related U.S. Application Data

(60) Provisional application No. 63/506,403, filed on Jun. 6, 2023.

(51) Int. Cl.
*B41J 2/175* (2006.01)
*B41J 2/14* (2006.01)
(Continued)

(52) U.S. Cl.
CPC ........... *B41J 29/02* (2013.01); *B41J 2/14201* (2013.01); *B41J 2/15* (2013.01); *B41J 2/175* (2013.01); *B65G 47/847* (2013.01)

(58) Field of Classification Search
CPC ... B41J 2/01; B41J 2/14201; B41J 2/15; B41J 2/175; B41J 29/02; B41J 29/06; B65G 47/847
See application file for complete search history.

(56) References Cited

U.S. PATENT DOCUMENTS 7,316,476 B2 * 1/2008 Yokoyama ............. B41J 29/393 347/19
7,866,810 B2 * 1/2011 Campion ................. B41J 11/06 347/106

(Continued)

FOREIGN PATENT DOCUMENTS

| | | | |
|---|---|---|---|
| CN | 106827812 | A | 6/2017 |
| CN | 220639255 | U | 3/2024 |
| WO | 2015095992 | A1 | 7/2015 |

OTHER PUBLICATIONS

Search Report mailed to Corresponding European Patent Application No. 24221907.9 dated Jun. 13, 2025.

*Primary Examiner* — Anh T Vo
(74) *Attorney, Agent, or Firm* — Rosenberg, Klein & Lee

(57) ABSTRACT

The invention provides a digital printing machine characterized by an innovative cantilever assembly that significantly enhances precision and efficiency in digital printing. The cantilever assembly utilizes a structurally optimized cantilever frame to achieve superior printing quality through precise component positioning. It features a novel dual slide rail system, consisting of first and second slide rails, sliders, and drivers, to ensure flexible and accurate nozzle movement. This configuration not only minimizes the machine's operational footprint but also maximizes print area utilization. The integration of the cantilever assembly into the digital printing machine facilitates high-quality, continuous printing across various textiles, surpassing traditional methods. Furthermore, the invention encompasses a continuous printing apparatus that incorporates this machine, along with a rotary conveying device, to automate the sequential printing process, thus addressing spatial and mechanical challenges.

19 Claims, 6 Drawing Sheets

(51) Int. Cl.

| | |
|---|---|
| ***B41J 2/15*** | (2006.01) |
| ***B41J 29/02*** | (2006.01) |
| ***B65G 47/86*** | (2006.01) |

(56) References Cited

U.S. PATENT DOCUMENTS

| | | | | |
|---|---|---|---|---|
| 7,988,259 | B2 * | 8/2011 | Hishida .............. | B41J 11/00214 347/51 |
| 2005/0018026 | A1 * | 1/2005 | Nerad ................ | B41J 11/00218 347/102 |
| 2006/0181567 | A1 * | 8/2006 | Tezuka ..................... | B41J 2/165 347/22 |
| 2006/0249039 | A1 | 11/2006 | Feldman et al. | |
| 2009/0090257 | A1 | 4/2009 | Feldman et al. | |
| 2020/0062003 | A1 * | 2/2020 | Levi ................... | B41J 11/00214 |

* cited by examiner

CANTILEVER ASSEMBLY, DIGITAL PRINTING MACHINE, AND CONTINUOUS PRINTING APPARATUS

CROSS-REFERENCE TO RELATED APPLICATION

This application claims priority for the U.S. provisional patent application No. 63/506,403 filed on 6 Jun. 2023, the content of which is incorporated by reference in its entirely.

BACKGROUND OF THE INVENTION

Field of the Invention

The present invention relates to a cantilever assembly designed for enhanced maneuverability and precise positioning of components in systems such as digital printing machines, manufacturing equipment, and other applications requiring accurate motion control.

Description of the Related Art

"Combined Stencil and Digital Printing System" that enables the objective of continuous digital printing is disclosed in patent no. U.S. 2006/0249039 A1. The digital printing system includes inkjet nozzles for printing pixelated digital images formed by hundreds and thousands of on-demand ink droplets in orthogonal coordinates that coincide with the length and width of a pallet.

The digital printing system also includes pallets that respectively support spokes of a carousel conveyor mechanism, occupying a pie-shaped wedge space. As the pallet moves closer to the hub center, the space between neighboring pallets becomes narrower. Furthermore, the digital printing system operates by sliding a matrix of inkjet nozzles back and forth along a motion gantry, which is supported at both ends to ensure structural integrity. However, when the motion gantry is used in conjunction with the carousel conveyor mechanism, the motion gantry limits the printing range of the inkjet nozzles.

SUMMARY OF THE INVENTION

An object of the present invention is to mobilize inkjet nozzles without interfering with each other in the pie-shaped wedge space and without having to extend the spokes far outward radially, i.e., realizing an un-interfering transverse space.

Another object of the present invention is to minimize acceleration and deceleration of the inkjet nozzles to position precisely and move stably in practice.

For the above purposes, the present invention provides a digital printing machine, the digital printing machine comprising: a carrier, a cantilever assembly, a printing device, an inkjet controller. The cantilever assembly being disposed on the carrier, the cantilever assembly comprising: a first base, a first slide rail, a first slider, a first driver, a second base, a cantilever frame, a second slide rail, a second slider, a second driver, and a carrying platform. The first slide rail is disposed on the first base. The first slider is disposed on the first slide rail. The first driver is disposed on one end of the first slide rail and coupled to the first slider for driving the first slider to reciprocate along the first slide rail in a first direction. The second base is disposed on the first slider. The cantilever frame has a fixed end disposed on the second base and a free end extending in a second direction perpendicular to the first direction. The second slide rail is disposed on the cantilever frame and arranged along the second direction. The second slider is disposed on the second slide rail. The second driver is disposed on the second slide rail and neighboring the fixed end of the cantilever frame, and the second driver is coupled to the second slider, for driving the second slider to reciprocate along the second slide rail. The carrying platform disposed on the second slider. The printing device disposed on the carrying platform of the cantilever assembly and disposed with a plurality of inkjet nozzles. The inkjet controller coupled to the first driver, the second driver, and the printing device to control movement of the first slider and the second slider and to control the plurality of inkjet nozzles to eject ink droplets.

In some embodiments, the printing device comprises up to 10 individual ink channels, each including a plurality of inkjet nozzles.

In some embodiments, the plurality of inkjet nozzles is arranged in a matrix and is individually driven by piezoelectric ceramics.

In some embodiments, the cantilever assembly further includes a first guide rail and a third slider. The first guide rail is disposed on the first base and arranged parallel to the first slide rail. The third slider disposed on the first guide rail and fixed to the second base. Furthermore, a height where the first slider is fixed to the second base is equal to a height where the third slider is fixed to the second base, such that the second base can maintain a horizontal level between the second base and the first base.

In some embodiments, the cantilever frame comprises: a first frame body and a second frame. The first frame body in which a fixed plate is embedded, the bottom of the first frame body being fixed to the second base. The second frame body comprising: two chord members parallel to each other; and a plurality of vertical supports arranged between the two chord members, and the first frame body and the second frame body are co-planar and jointly connected to the second slide rail.

In some embodiments, the second slide rail and the second slider are driven by a ball screw that consists of a lead screw and a bearing.

In some embodiments, the lead screw has a length ranging from 400 to 1800 mm, a diameter ranging from 8 to 18 mm, and a pitch ranging from 10 to 30 mm, and is capable of rotating from 600 to 3000 rpm.

In some embodiments, the total weight of the carrying platform and its payloads is less than 8 kg.

In some embodiments, the cantilever frame is a hollow truss frame.

The present invention also provides a continuous printing apparatus that includes the aforementioned digital printing machine and a rotary conveying device. The rotary conveying device rotates to move a plurality of pallets to the printing device, sequentially.

The cantilever assembly of the present invention utilizes a cantilever frame structurally optimized for precise positioning of inkjet nozzles over a wide range of motion without interfering with adjacent operational spaces. With the combination of the first slide rail and the second slide rail, along with corresponding sliders and drivers, the cantilever assembly achieves unparalleled flexibility and accuracy in nozzle positioning. The cantilever assembly not only minimizes the space required for operation by cleverly utilizing a cantilever mechanism but also significantly reduces the acceleration and deceleration distances for the nozzle carriage. This improvement ensures that a greater portion of the motion area is utilized for actual printing, thereby increasing space utilization efficiency.

Below, the embodiments are described in detail in cooperation with the drawings to facilitate a clear understanding of the technical contents, characteristics, and accomplishments of the present invention.

BRIEF DESCRIPTION OF THE DRAWINGS

The details of one or more aspects of the cantilever assembly, the digital printing machine, and the continuous printing apparatus are described below. The use of the same reference numbers in different instances in the description and the figures indicate similar elements.

DETAILED DESCRIPTION OF THE INVENTION

Figure 1:
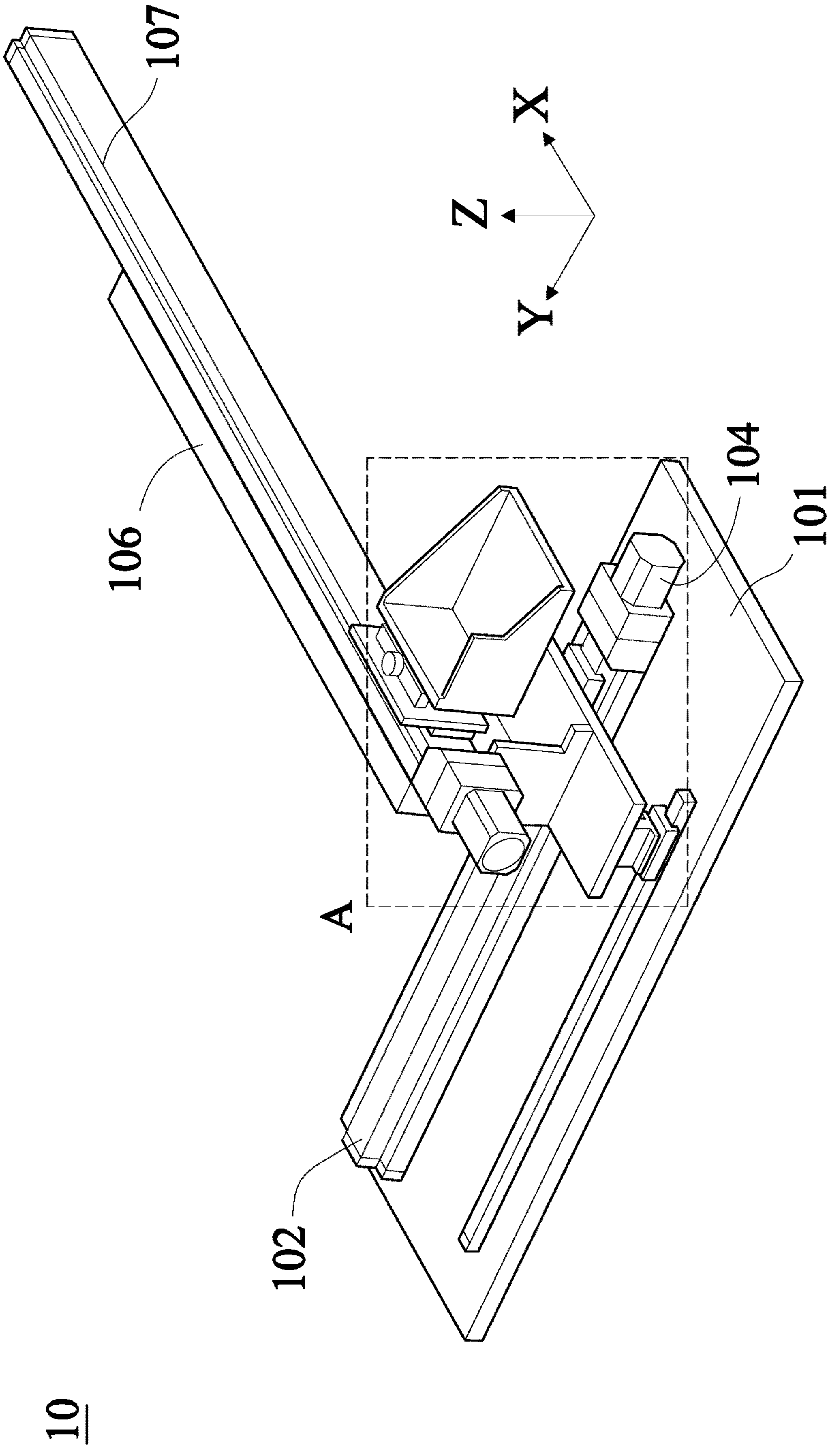
FIG. 1 is a perspective view of a cantilever assembly according to an embodiment of the present invention.

A plurality of embodiments of the present application will be disclosed in the following drawings. For the purpose of clear explanation, many implementation details will be explained together in the following description. However, it should be understood that these implementation details should not limit the invention. That is to say, in some embodiments of the invention, these implementation details are not necessary. In addition, for the purpose of simplifying the drawings, some commonly used structures and components will be illustrated in a simple and schematic manner in the drawings. In the following embodiments, the same or similar components will be represented with the same reference numerals.

Figure 2:
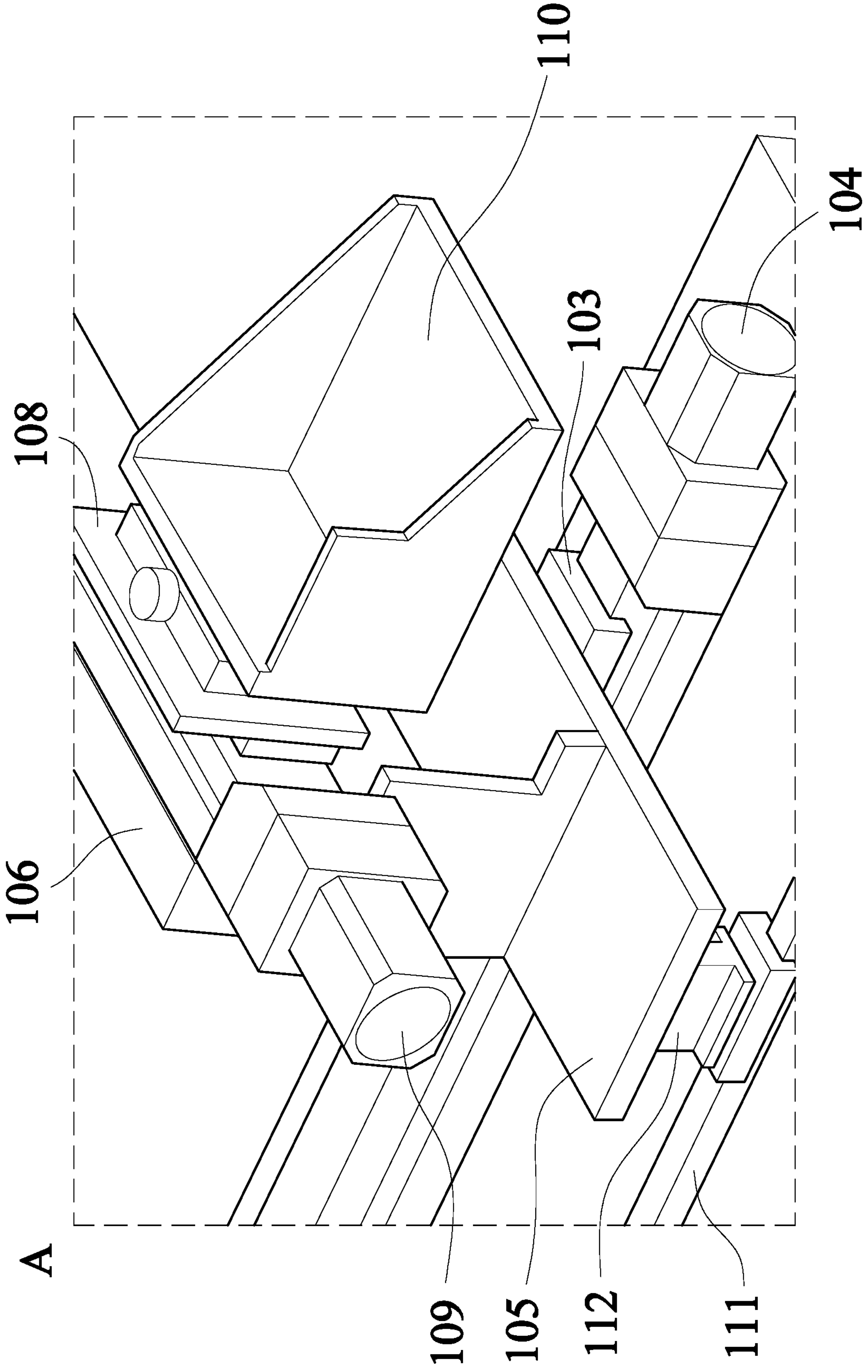
FIG. 2 is an enlarged view of the area labeled "A" in FIG. 1.

Refer to FIGS. 1 and 2, showing a perspective view of a cantilever assembly of the embodiment and an enlarged view of the area labeled "A" in FIG. 1, respectively. A cantilever assembly 10 includes a first base 101, a first slide rail 102, a first slider 103, a first driver 104, a second base 105, a cantilever frame 106, a second slide rail 107, a second slider 108, and a second driver 109. The first slide rail 102 is disposed on the first base 101. The first slider 103 is disposed on the first slide rail 102. The first driver 104 is disposed on one end of the first slide rail 102 and coupled to the first slider 103 for driving the first slider 103 to reciprocate along the first slide rail 102 in a first direction (Y-axis direction). The second base 105 is disposed on the first slider 103. The cantilever frame 106 having a fixed end disposed on the second base 105 and a free end extending in a second direction (X-axis direction) perpendicular to the first direction. The second slide rail 107 is disposed on the cantilever frame 106 and arranged along the second direction. The second slider 108 is disposed on the second slide rail 107. The second driver 109 is disposed on the second slide rail 107 and neighboring the fixed end of the cantilever frame 106, and the second driver 109 is coupled to the second slider 108 for driving the second slider 108 to reciprocate along the second slide rail 107.

Figure 3:
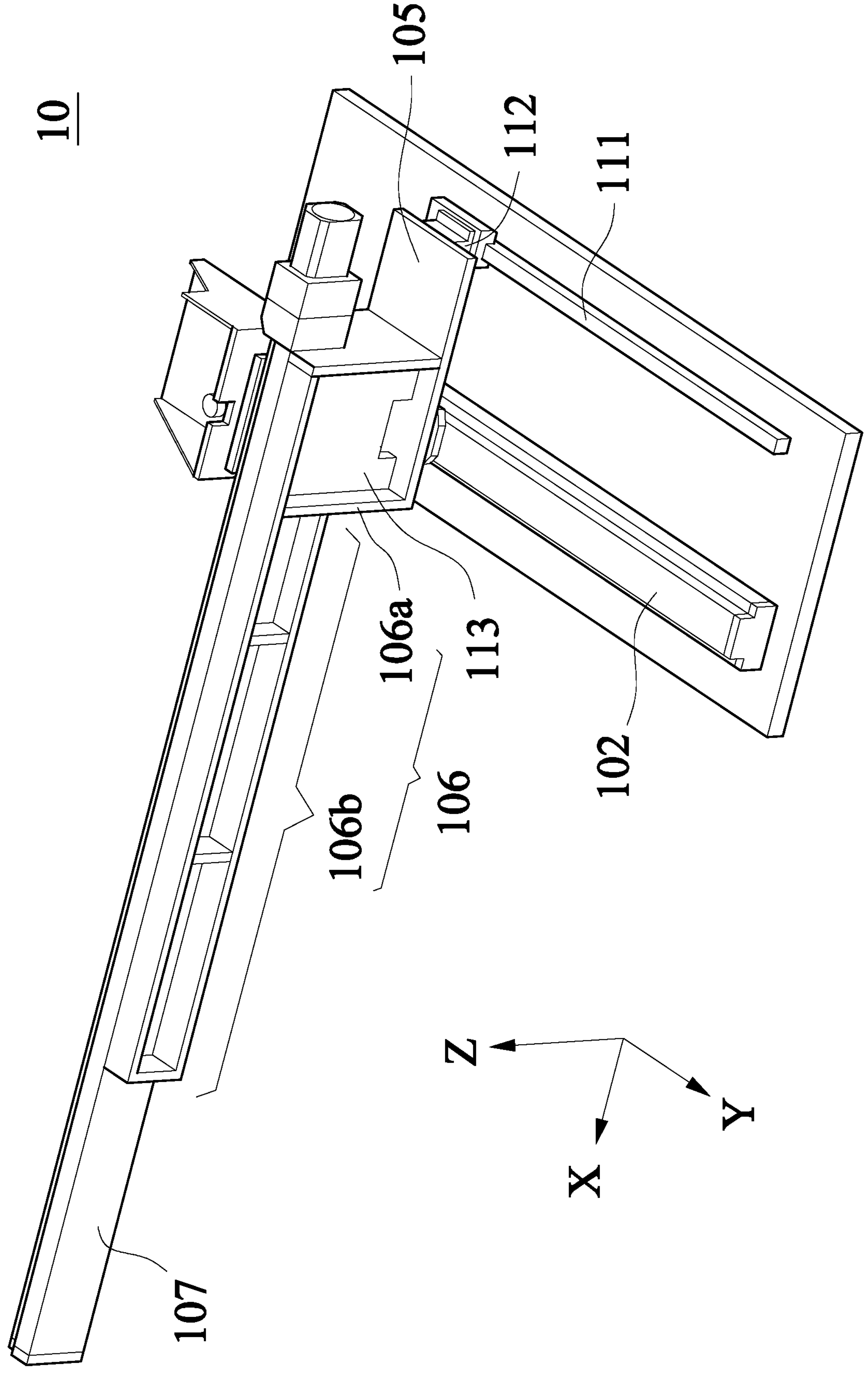
FIG. 3 is another perspective view of a cantilever assembly according to an embodiment of the present invention.
Figure 4:
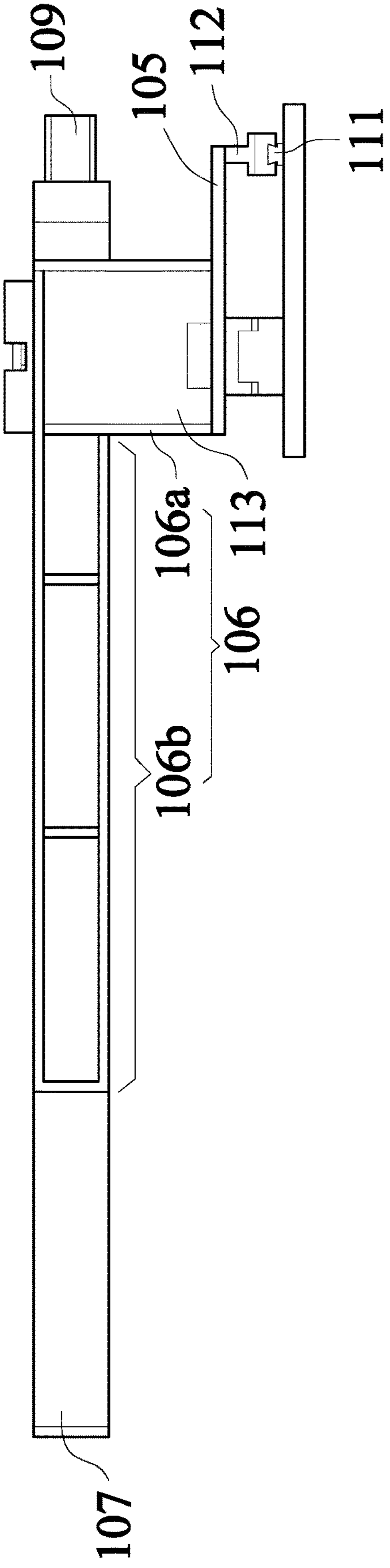
FIG. 4 is a side view of a cantilever assembly according to an embodiment of the present invention.

Refer to FIGS. 3-4, showing another perspective view of a cantilever assembly of the embodiment and a side view thereof, respectively. The cantilever assembly 10 further includes a first guide rail 111 and a third slider 112. The first guide rail 111 is disposed on the first base 102 and arranged parallel to the first slide rail 102. The third slider 112 disposed on the first guide rail 111 and fixed to second base 105. Furthermore, a height where the first slider 103 is fixed to the second base 105 is equal to a height where the third slider 112 fixed to the second base 105, such that the second base 105 can maintain in horizontal level between the second base 105 and the first base 101.

The second slide rail 107 extends along the second direction and is mounted on the cantilever frame 106. When an object moves along the second direction, the farther the object moves from the fixed end of the cantilever frame 106, the greater the torque (t) is generated, which may cause the cantilever assembly 10 to tip over. Therefore, the following four embodiments are provided to prevent the cantilever assembly 10 from tipping over.

To effectively tackle the challenge of increasing torque, especially when an object moves away from the fixed end of the cantilever frame 106 along the second direction, this invention introduces a suite of innovative measures to bolster the structural stability of the cantilever assembly 10, thereby preventing potential tipping due to excessive torque. These measures encompass the introduction of additional securing mechanisms, the adjustment of weight distribution, and the refinement of the driving and support systems. The four embodiments described herein each offer distinct approaches to mitigate the generated torque, ensuring the cantilever assembly's stability and safety throughout its operation.

1. The addition of extra securing structures: As the second driver 109 drives the first slider 103 to reciprocate along the first slide rail 102, since both the first slider 103 and the third slider 112 are connected to the second base 105, the third slider 112 also moves synchronously along the first direction. Engaging the first guide rail 111 and third slider 112 to the cantilever assembly 10 can maintain moment balance and prevent the cantilever assembly 10 from tipping over, i.e., anti-rotational moment.
2. Reduction of the weight of the cantilever frame 106: The cantilever frame 106 can be a hollow truss frame, reducing the weight of the cantilever frame 106. In this embodiment, the linear tracks constituting the ball screw-driven can respectively be: (a) For the first slide rail 101 and the first slider 103, the ball screw shaft is coupled to and driven by the first driver 104. (b) For the second slide rail 107 and the second slider 108, the ball screw shaft is coupled to and driven by the second driver 109. The linear tracks of this embodiment can reduce the weight of the second slide rail 107, while other driving methods require additional components to be installed on the track, significantly increasing the weight of the second slide rail 107. For example, belt drives require rollers at the ends of the track to move the belt, and the rollers for belt drives not only need more space for acceleration and deceleration but are significantly less efficient. Linear motors require stators to be installed on the track, which also increases the track's weight. In this embodiment, a backing hull-and-ribs structure can be assembled to reinforce the cantilever frame 106. The hull-and-ribs structure is made of aluminum alloy, forming a strong but lightweight hollow cantilever beam. The carrying platform 110 disposed on the second slider 108 of the second slide rail 107 could overhang beyond the end of the cantilever frame 106 no more than one-third of the motion range.

3. Increased printing range: With the given ball screw lead pitch, one can convert the angular motor registration to a virtual linear lead-screw registration, acquiring a precise position that coincides with the pixelated image. The plurality of inkjet nozzles, piezoelectric driven, can deliver on-demand droplets of color inks to the exact location, achieving synchronization of motion and ink jetting. Unlike conventional inkjet machines constructed with both belts and pulleys or linear actuators, no additional linear ruler is required. The conversion of angular registration to linear registration can be calculated with the following equation:

$$Pr = Lr\frac{Pe}{Dr}Lp$$

Where,

Pr represents regenerated registration count number of the pulse;

Lp represents lead screw pitch (mm per revolution);

Lr represents regenerated linear resolution regenerated counts per mm;

Pe represents the encoder registration count number of the pulse; and

Dr represents encoding resolution registration counts per revolution

Figure 6:
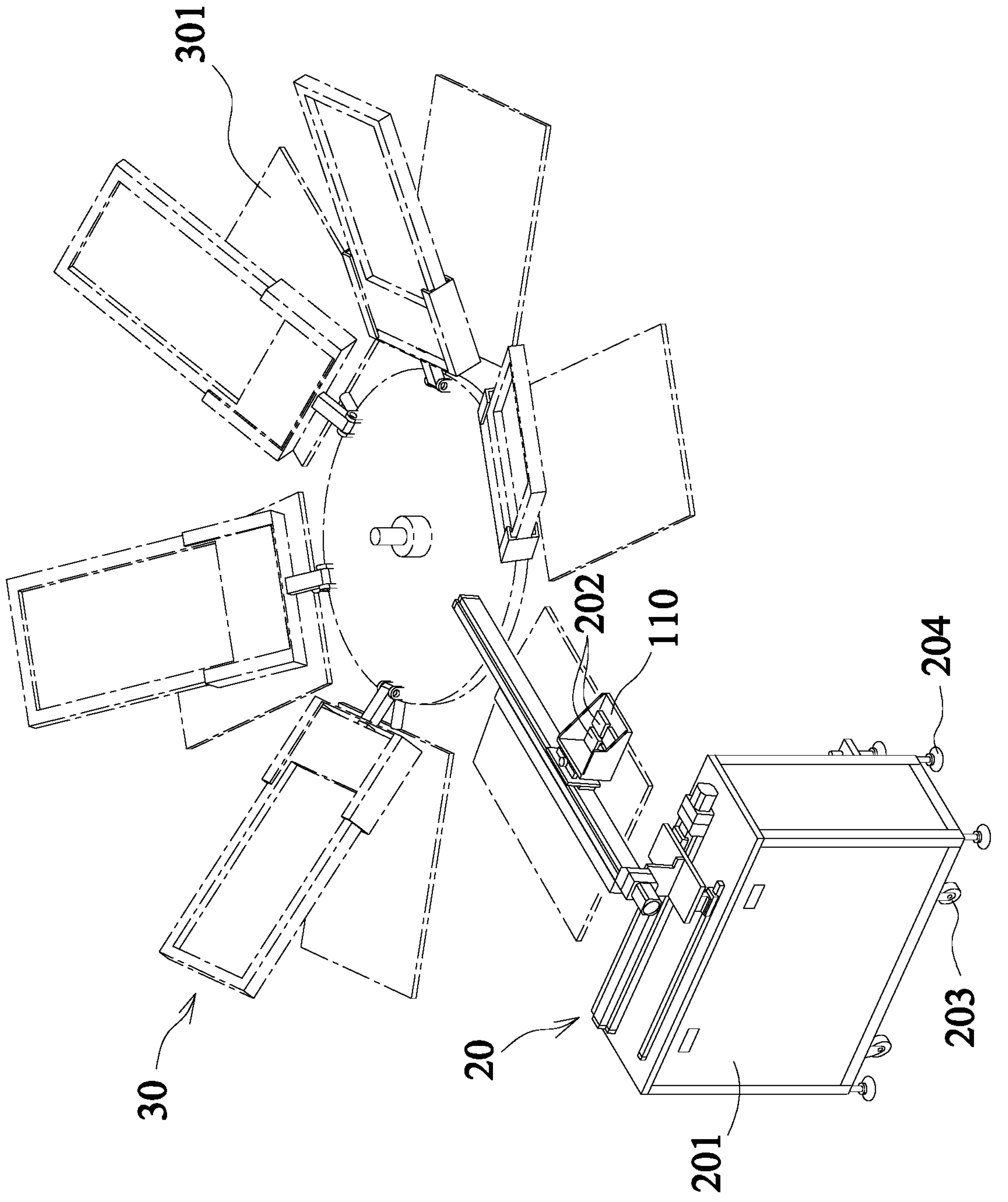
FIG. 6 is a perspective view of a continuous printing apparatus according to an embodiment of the present invention.

4. Enhancement of the support of the cantilever frame 106: The cantilever frame 106 includes a first frame body 106*a* and a second frame body 106*b*. The first frame body 106*a* is embedded with a fixed plate 113, and the bottom of the first frame body 106*a* is fixed to the second base 105. The second frame body 106*b* includes two chord members and a plurality of vertical supports. The chord members are parallel to each other. The plurality of vertical supports is arranged between the two chord members. The first frame body and the second frame body are co-planar and jointly connected to the second slide rail. Furthermore, the fixed plate 113, such as a parallelogram, rectangle, and square, is preferably chosen to install with a tight fit within the inner frame of the first frame body 106*a*. This staggered far-end of the cantilever frame 106 reduces the thickness of the arm in the converged section of the hub system, allowing more freedom of transverse movement without interfering with peripherals above neighboring pallets 301 (as shown in FIG. 6).

To achieve the purpose of transporting goods, in some embodiments, the cantilever assembly 106 further includes a carrying platform 110 disposed on the second slider 108.

Figure 5:
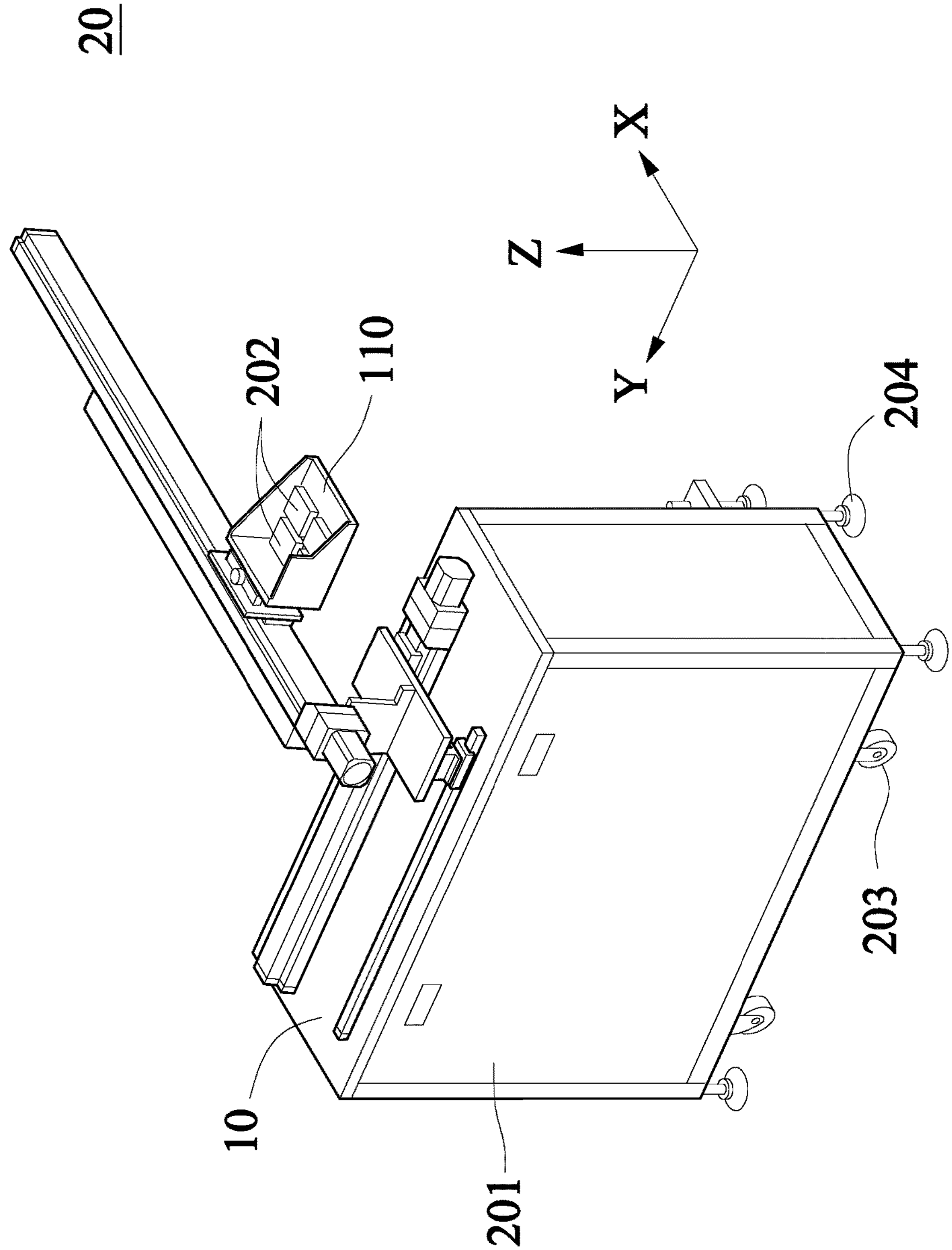
FIG. 5 is a perspective view of a digital printing machine according to an embodiment of the present invention.

Refer to FIG. 5, a perspective view of a digital printing machine according to an embodiment of the present invention. A digital printing machine 20 that includes a carrier 201, the cantilever assembly 10, a printing device 202, and an inkjet controller (not shown in the figure) is provided. The cantilever assembly 10 is disposed on the carrier 201. The printing device 202 is disposed on the carrying platform 110 of the cantilever assembly 10, the printing device 202 is disposed with a plurality of inkjet nozzles. The inkjet controller is coupled to the first driver 104 the second driver 109 to respectively control movement of the first slider 103 and the second slider 108 and coupled to the printing device 202 to control the plurality of inkjet head for ejecting ink droplets. Specifically, the plurality of inkjet nozzles are arranged in a matrix and are individually driven by piezoelectric ceramics.

To facilitate the movement of the digital printing machine 20, the top surface of the carrier is equipped with the cantilever assembly, and the bottom surface of the carrier is disposed on a roller 203 and an adjustable support foot 204.

Refer to FIG. 6, a perspective view of a continuous printing apparatus according to an embodiment of the present invention. A continuous printing apparatus that includes the digital printing machine 20 and a rotary conveying device 30 is provided. The rotary conveying device 30 is used to rotate to move a plurality of pallets 301 to the printing device 202, sequentially.

In the present invention, two motion stage arms assembled in an orthogonal configuration are employed. The two motion stage arms are the first slide rail 102 (Y-axis direction) and the second slide rail 107 (X-axis direction), respectively. The first slide rail 102 is laid on the first base 101 which is flat and stationary. The second slide rail 107, through its coupling mechanism with the first slider 103 and the second base 105, can move along the first slide rail 102 in the Y-axis direction. In addition, the second slider 108 can move along the second slide rail 107 in the X-axis direction, thereby forming an X-Y axis motion trajectory.

Specifically, the printing device 220 is disposed with a matrix of inkjet nozzles. The inkjet nozzles are attached to the carrying platform 110 and coupled to the printing device 220 to travel along the second slide rail 107 to deliver ink droplets at precise locations, forming a specific digital image on a textile media.

In some embodiments, the printing device 220 are up to 10 individual ink channels, each including a plurality of inkjet nozzles. The inkjet nozzles actuate with individual piezoelectric ceramics to generate on-demand ink droplets. The 10 channels can be assigned to the same color of inks or various colors of inks.

To ensure a short and firm acceleration/deceleration of the nozzle carriage, the second slide rail 107 and the second slider 108 can be driven by a ball screw consisting of a lead screw and bearings. Specifically, the lead screw is supported by the bearings at both ends of linear motion section, and a nut-and-ball moving stage sliding against the second slide rail 107.

To enhance the precision and efficiency of the digital printing machine, particularly in achieving short and firm acceleration/deceleration of the nozzle carriage, this embodiment introduces two features:

Rotation Speed Range for Optimal Printing Performance: The driving components, such as ball screws, which control the movement of the printing device along the X and Y axes, are designed to be capable of rotating from 600 revolutions per minute (rpm) to 3000 rpm. This recommended range of rotation speeds is critical for ensuring both the quality and efficiency of printing. It allows for rapid and smooth adjustment of the print head's position to accommodate different printing tasks and media types, enhancing overall printing efficiency while maintaining high print quality. By precisely controlling the rotation speed within this range, the digital printing machine achieves accurate positioning of the print medium, allowing inkjet nozzles to eject ink droplets at precise locations for high-resolution image printing. Furthermore, this speed range helps reduce vibrations from fast movements, enhancing the stability of the printing process and the consistency of the printed products.

Lead Screw Specifications for Enhanced Mechanical Stability: To support the innovative unilateral cantilever structure, which eliminates the need for support points at the far end and significantly expands the workspace available for printing, this embodiment employs a lead screw with specific dimensions. The lead screw, a critical component of the ball screw drive, has a length ranging from 400 mm to 1800 mm, a diameter from 8 mm to 18 mm, and a pitch from 10 mm to 30 mm. The lead screw can be constructed from steel alloy or any lightweight material with comparable support strength, the lead screw not only provides the necessary mechanical strength and stability for the cantilever structure but also ensures high precision and reliability in moving the printing device. Contrary to the prior art, which utilized linear motors or belt drives and faced challenges related to 'span' necessitating the use of support structures akin to gantries, this invention substantially improves the flexibility and operational efficiency of the printing machine. The traditional 'span' issues, characterized by the need for extensive support mechanisms to mitigate structural instability over long distances, are adeptly addressed by the novel approach of this invention, eliminating the dependency on gantry-like supports.

Building on the two features outlined above, it is possible to create a compact digital printing machine. Through rigorous testing, it has been confirmed that the carrying platform 110, along with its printing device 202, can safely execute printing operations when the total weight is kept below 8 kg. This weight limitation plays a crucial role in maintaining the efficiency and stability of the printing process. By ensuring that the combined weight of the carrying platform and its payloads does not exceed this threshold, the digital printing machine benefits from reduced mechanical stress and enhanced maneuverability. This not only facilitates smoother and more precise movements but also contributes to the overall longevity of the machine by minimizing wear and tear on the mechanical components. The ability to maintain optimal performance while adhering to this weight restriction underscores the effectiveness of the machine's design in delivering high-quality printing results without compromising on safety or reliability.

According to the above embodiments, the effects of the present invention include but not limit to:

1. Enhanced Precision and Efficiency: The cantilever assembly facilitates precise positioning of inkjet nozzles and other operational elements, significantly enhancing the printing quality and efficiency by reducing spatial constraints and improving maneuverability.
2. Reduced Space Requirement: The innovative design of the cantilever frame and its integration with the first and second slide rails and the sliders minimize the required operational footprint, enabling more compact machine design without compromising functionality.
3. Improved Stability and Safety: By incorporating a truss frame and additional securing structures, the cantilever assembly remains stable under dynamic operational conditions, reducing the risk of tipping and enhancing overall machine safety.
4. Versatile Application Potential: The design for the cantilever assembly is not only beneficial for digital printing machines but also adaptable to various other applications requiring precise motion control, such as manufacturing and material handling equipment.
5. Cost and Time Efficiency: The cantilever assembly reduces the need for excessive acceleration and deceleration distances for the carrying platform, leading to faster operation times and lower energy consumption, thereby reducing operational costs.

The embodiments described above are only to exemplify the present invention but not to limit the scope thereof. Therefore, any equivalent modification or variation according to the shapes, structures, features, or spirit disclosed by the present invention is to be also included within the scope thereof.

What is claimed is:

1. A digital printing machine, comprising:

a carrier;

a cantilever assembly, the cantilever assembly being disposed on the carrier, the cantilever assembly comprising:

a first base;

a first slide rail disposed on the first base;

a first slider disposed on the first slide rail;

a first driver disposed on one end of the first slide rail and coupled to the first slider, for driving the first slider to reciprocate along the first slide rail in a first direction;

a second base disposed on the first slider;

a cantilever frame having a fixed end disposed on the second base and a free end extending in a second direction perpendicular to the first direction;

a second slide rail disposed on the cantilever frame and arranged along the second direction;

a second slider disposed on the second slide rail; and a second driver disposed on the second slide rail and neighboring the fixed end of the cantilever frame, the second driver being coupled to the second slider, for driving the second slider to reciprocate along the second slide rail;

a carrying platform disposed on the second slider;

a printing device disposed on the carrying platform of the cantilever assembly and disposed with a plurality of inkjet nozzles; and an inkjet controller coupled to the first driver, the second driver, and the printing device to control movement of the first slider and the second slider and to control the plurality of inkjet nozzles to eject ink droplets.

2. The digital printing machine according to claim 1, wherein the printing device comprises up to 10 individual ink channels, each including a plurality of inkjet nozzles.

3. The digital printing machine according to claim 1, wherein the plurality of inkjet nozzles is arranged in a matrix and is individually driven by piezoelectric ceramics.

4. The digital printing machine according to claim 1, further comprising:

a first guide rail disposed on the first base and arranged parallel to the first slide rail; and a third slider disposed on the first guide rail and fixed to the second base.

5. The digital printing machine according to claim 4, wherein a height where the first slider is fixed to the second base is equal to a height where the third slider is fixed to the second base, such that the second base can maintain in horizontal level.

6. The digital printing machine according to claim 1, wherein the cantilever frame is a hollow truss frame.

7. The digital printing machine according to claim 1, wherein the cantilever frame comprises:

a first frame body in which a fixed plate is embedded, the bottom of the first frame body being fixed to the second base; and a second frame body comprising:

two chord members parallel to each other; and a plurality of vertical supports arranged between the two chord members;

wherein the first frame body and the second frame body are co-planar and jointly connected to the second slide rail.

8. The digital printing machine according to claim 1, wherein the second slide rail and the second slider are driven by a ball screw that consists of a lead screw and a bearing.

9. The digital printing machine according to claim 8, wherein the lead screw has a length ranging from 400 to 1800 mm, a diameter ranging from 8 to 18 mm, and a pitch ranging from 10 to 30 mm, and is capable of rotating from 600 to 3000 rpm.

10. The digital printing machine according to claim 1, wherein the total weight of the carrying platform and its payloads is less than 8 kg.

11. A continuous printing apparatus, comprising:

a digital printing machine according to claim 1; and a rotary conveying device used to rotate to sequentially move the plurality of pallets to the printing device.

12. The continuous printing apparatus according to claim 11, wherein the printing device comprises up to 10 individual ink channels, each including a plurality of inkjet nozzles.

13. The continuous printing apparatus according to claim 11, wherein the plurality of inkjet nozzles is arranged in a matrix and is individually driven by piezoelectric ceramics.

14. The continuous printing apparatus according to claim 11, further comprising:

a first guide rail disposed on the first base and arranged parallel to the first slide rail; and a third slider disposed on the first guide rail and fixed to the second base.

15. The continuous printing apparatus according to claim 14, wherein a height where the first slider is fixed to the second base is equal to a height where the third slider is fixed to the second base, such that the second base can maintain in horizontal level.

16. The continuous printing apparatus according to claim 11, wherein the cantilever frame is a hollow truss frame.

17. The continuous printing apparatus according to claim 11, wherein the cantilever frame comprises:

a first frame body in which a fixed plate is embedded, the bottom of the first frame body being fixed to the second base; and a second frame body comprising:

two chord members parallel to each other; and a plurality of vertical supports arranged between the two chord members;

wherein the first frame body and the second frame body are co-planar and jointly connected to the second slide rail.

18. The continuous printing apparatus according to claim 11, wherein the second slide rail and the second slider are driven by a ball screw that consists of a lead screw and a bearing.

19. The continuous printing apparatus according to claim 18, wherein the lead screw has a length ranging from 400 to 1800 mm, a diameter ranging from 8 to 18 mm, and a pitch ranging from 10 to 30 mm, and is capable of rotating from 600 to 3000 rpm; and the digital printing machine according to claim 10, wherein the total weight of the carrying platform and its payloads is less than 8 kg.

* * * * *